United States Patent
Barrus et al.

(10) Patent No.: US 6,981,120 B1
(45) Date of Patent: Dec. 27, 2005

(54) METHOD AND APPARATUS FOR VIRTUAL MEMORY SEGMENTATION

(75) Inventors: Frank E. Barrus, New Ipswich, NH (US); Lawrence R. Rau, Dublin, NH (US); Craig F. Newell, Lowell, MA (US)

(73) Assignee: SavaJe Technologies, Inc., Chelmsford, MA (US)

( * ) Notice: Subject to any disclaimer, the term of this patent is extended or adjusted under 35 U.S.C. 154(b) by 426 days.

(21) Appl. No.: 10/287,868

(22) Filed: Nov. 4, 2002

(51) Int. Cl.[7] .............................................. G06F 12/00
(52) U.S. Cl. ...................... 711/200; 711/202; 711/203; 711/206; 711/208
(58) Field of Search ........................ 711/200, 202, 203, 711/206, 208

(56) References Cited

U.S. PATENT DOCUMENTS

| | | | |
|---|---|---|---|
| 6,145,064 A * | 11/2000 | Long et al. ................. | 711/158 |
| 6,425,039 B2 * | 7/2002 | Yoshioka et al. ........... | 710/269 |
| 6,658,538 B2 * | 12/2003 | Arimilli et al. ............. | 711/141 |
| 6,886,085 B1 * | 4/2005 | Shuf et al. ................... | 711/159 |
| 2004/0078631 A1 * | 4/2004 | Rogers et al. ................. | 714/5 |

* cited by examiner

*Primary Examiner*—Donald Sparks
*Assistant Examiner*—Ngoc V. Dinh
(74) *Attorney, Agent, or Firm*—Hamilton, Brook, Smith & Reynolds, P.C.

(57) ABSTRACT

Memory and processing required for managing virtual memory segments is reduced by overloading the existing page table entries in a virtual memory page table to encode virtual memory segmentation data. Therefore, no additional data structures are required for virtual memory segment management. Virtual memory segmentation information is stored in the actual page table entries, using bits that are reserved as unused for the given computer architecture to identify the virtual memory segment management information.

21 Claims, 8 Drawing Sheets

| | -1 | 0 | 1 | 2 | 3 | 4 | 5 | 6 | 7 | 8 | 9 | 10 | 11 | 12 | 13 | ... | 255 |
|---|---|---|---|---|---|---|---|---|---|---|---|---|---|---|---|---|---|
| | RH PTE | Alloc. PTE | Alloc. PTE | RH PTE | FH PTE | FH PTE | RH PTE | Alloc. PTE | Alloc. PTE | Alloc. PTE | RH PTE | Alloc. PTE | RH PTE | FH PTE | FH PTE | ... | |
| | 02 | 07 | 08 | 02 | 12 | 00 | 03 | 14 | 18 | 23 | 01 | 05 | 02 | 00 | 00 | | |

Page Table 130

FIG. 3A

| | -1 | 0 | 1 | 2 | 3 | 4 | 5 | 6 | 7 | 8 | 9 | 10 | 11 | 12 | 13 | ... | 255 |
|---|---|---|---|---|---|---|---|---|---|---|---|---|---|---|---|---|---|
| | RH PTE | Alloc. PTE | Alloc. PTE | RH PTE | FH PTE | FH PTE | RH PTE | FH PTE | FH PTE | FH PTE | RH PTE | Alloc. PTE | RH PTE | FH PTE | FH PTE | ... | |
| | 02 | 07 | 08 | 02 | 06 | 00 | 03 | 12 | 00 | 00 | 01 | 05 | 02 | 00 | 00 | | |

Page Table 130

FIG. 3B

| | -1 | 0 | 1 | 2 | 3 | 4 | 5 | 6 | 7 | 8 | 9 | 10 | 11 | 12 | 13 | ... | 255 |
|---|---|---|---|---|---|---|---|---|---|---|---|---|---|---|---|---|---|
| | RH PTE | Alloc. PTE | Alloc. PTE | RH PTE | FH PTE | FH PTE | FH PTE | FH PTE | FH PTE | FH PTE | RH PTE | Alloc. PTE | RH PTE | FH PTE | FH PTE | ... | |
| | 02 | 07 | 08 | 06 | 12 | 00 | 00 | 00 | 00 | 00 | 01 | 05 | 02 | 00 | 00 | | |

Page Table 130

METHOD AND APPARATUS FOR VIRTUAL MEMORY SEGMENTATION

BACKGROUND OF THE INVENTION

This invention relates generally to segment management in a computer virtual memory system, and more specifically to reducing the memory and processing required for managing virtual memory segments by overloading the use of existing page table entries in a virtual memory page table.

Existing virtual memory management systems implement various schemes for keeping track of which virtual memory segments are mapped to which physical pages of working (physical) memory. These systems require the allocation of additional memory for "bookkeeping" data structures to keep track of these virtual and physical memory address mappings.

Certain terms are commonly used in the field of virtual memory segmentation, including a "page" which is defined as a set of bytes in working/physical memory aligned to a specific byte boundary. On the Advanced RISC Machine (ARM) architecture, a set of 4096 (4K) bytes aligned to a 4 K byte boundary is a standard-sized page, there can also be large pages (e.g., 64K). A virtual memory "segment" is one or more consecutive pages mapped into a virtual memory range. A "range" is a portion of the total virtual memory address space which is a multiple of 1 MB in size, and which starts on a 1 MB boundary. A "page table" (PT) on an ARM is a set of 256 consecutive page table entries. Each page table is 1024 (1K) bytes in size. Multiple page tables can exist contiguously, or scattered, in memory. A "page table entry" (PTE) is a descriptor which contains the physical memory address for a page, along with flag bits describing the permissions and caching that should be used when accessing that page. On the ARM architecture each PTE is exactly one word (32 bits) in size. A "memory management unit" (MMU) is the portion of a computer architecture that interprets the page table entries and uses them to translate virtual memory addresses to physical memory addresses. A "page index" is a page number within a given range, such that multiplying the page index by the page size (e.g., 4096) and adding the resulting product to the base address for the range, will yield a valid virtual memory address.

All of virtual memory (e.g., 4 GB on an ARM) is divided up into ranges, which describe regions (e.g., 1 MB or more) of memory, defined in multiples of the range base size (e.g., 1 MB). Within each range, there can be multiple segments (e.g., 4K or more) of virtual memory, defined in multiples of the segment base size (e.g., 4K). As mentioned above, a page table consists of a series of page table entries (PTEs) that indicate the physical memory addresses and permissions for the pages that correspond to each virtual memory address. Within the page table there are a mix of PTEs corresponding to allocated and free segments. A free segment means that the span of virtual memory addresses is available, and has no direct correlation to physical memory addresses.

Virtual memory segment management processes use the above-described data structures in order to perform memory (virtual-physical) translation operations.

SUMMARY OF THE INVENTION

In the present invention, memory and processing required for managing virtual memory segments are reduced by overloading the existing page table entries in a virtual memory page table to encode virtual memory segmentation data. Therefore, no additional data structures are required for virtual memory segmentation information management. Virtual memory segmentation information is stored in the actual page table entries, using bits that are reserved as unused for the given computer architecture to identify the virtual memory segment management information.

A method and apparatus of the present invention for managing memory segmentation in a virtual memory system comprises the step of creating a range descriptor for managing segmentation using a page table. The range descriptor contains an index value corresponding to a first free segment in the page table. For each allocated segment or free segment, the present invention encodes a reserved header page table entry to indicate that the segment is reserved and to indicate a size of the segment. A respective reserved header page table entry precedes each segment that is an allocated segment or a free segment. For each free segment, the present invention encodes a free header page table entry to indicate that the segment is free and to indicate a value for the index within the page table. The index value corresponds to the next free segment. A respective free header page table entry precedes each segment that is a free segment. Address translation operations are performed within the virtual memory system using the range descriptor, the reserved header page table entry and the free header page table entry such that allocation of additional virtual memory system data structures is avoided.

By overloading the existing page table of a virtual memory system and avoiding additional virtual memory system data structures, processing and memory overhead is reduced in the present invention. Because the present invention provides for both virtual-physical memory mapping information and memory segmentation information to be stored in a single page table, only one memory fetch is required in order to obtain both sets of information. Storing both sets of information in the same data structure (page table), as opposed to two separate and discrete data structures, as is the norm in conventional systems, also avoids the processing costs of processing redundant information.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. In accordance with the present invention memory for virtual memory segmentation data structures is reduced by overloading existing page table entries in the page table. In an embodiment of the present invention, one unmapped page is defined between all segments. The unmapped page is represented by ah invalid PTE in the page table. This invalid PTE is used to store virtual memory segmentation information, thus eliminating the need for extra data structures to store virtual memory segmentation information. This unmapped page can also be used to trap memory accesses that go beyond the beginning or end of a segment.

Figure 1A:
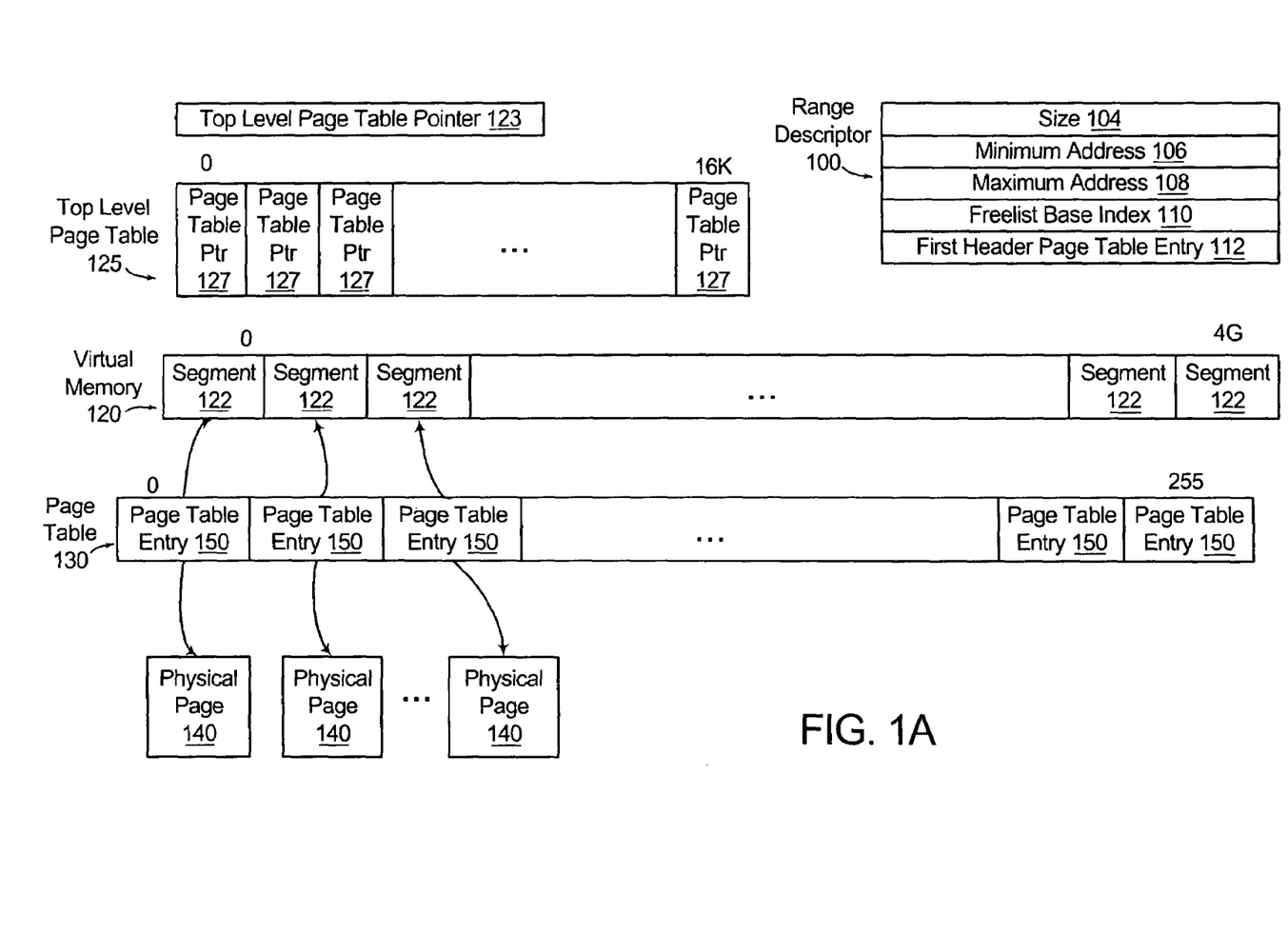
FIGS. 1A and 1B are diagrams of virtual memory segmentation data structures configured according to an embodiment of the present invention.
Figure 1B:
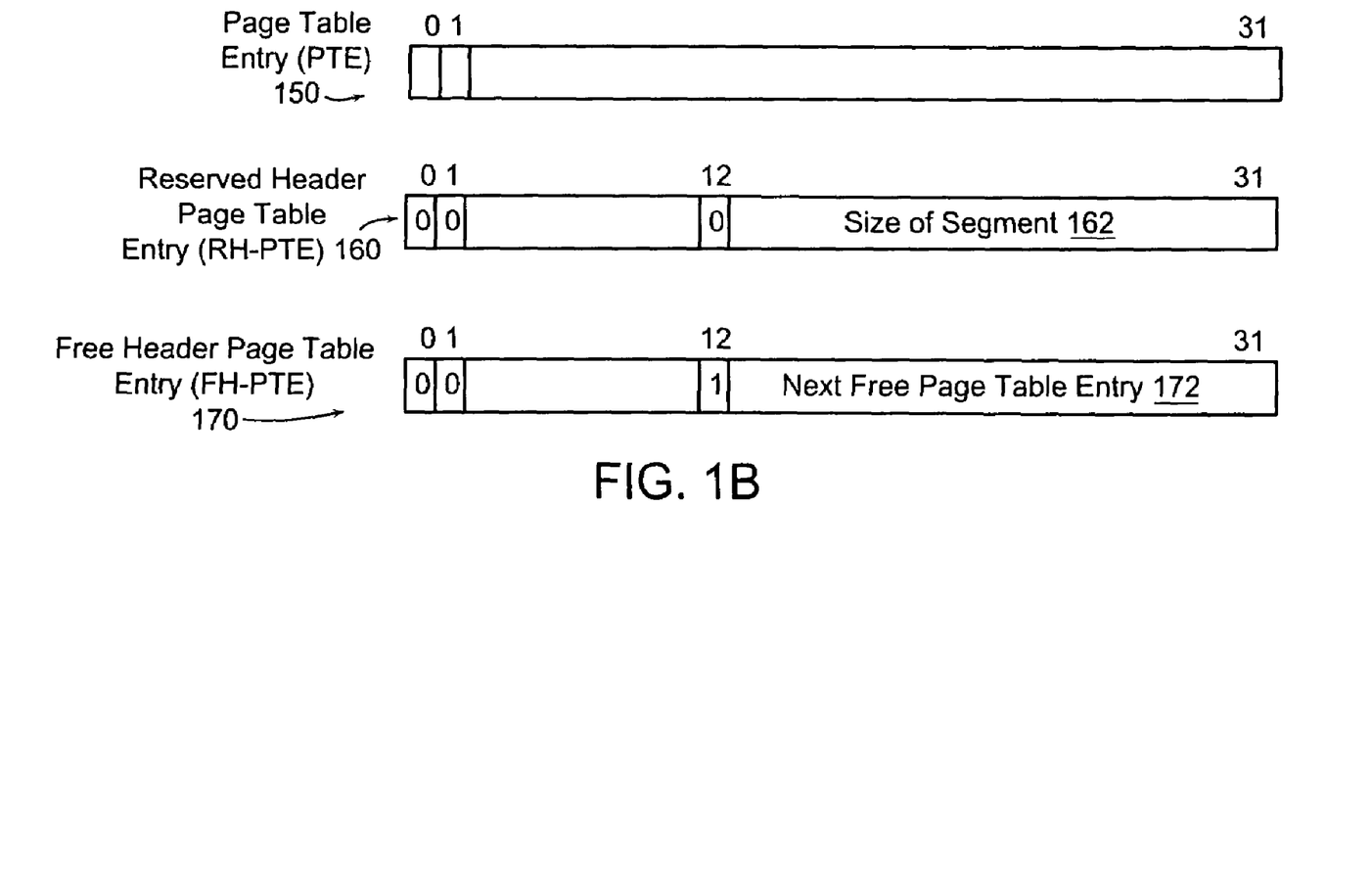

FIGS. 1A and 1B are diagrams of virtual memory segmentation data structures configured according to an embodiment of the present invention. A range descriptor 100 contains various bits of bookkeeping information for the range of virtual memory. A size field 104 defines the size of the subject range, and minimum address 106 and maximum address 108 define the minimum and maximum address, respectively, of the range. A freelist base index 110 stores the index value within the page table 130 corresponding to the table entry of the first free segment 122 in the range. A first header page table entry 112 holds header information for the first segment 122 in the range. The first header page table entry 112 is stored in the range descriptor 100 to enable the first page table entry 150 in the page table 130 to be a non-header page table entry and begin at a range boundary offset. In a preferred embodiment of the present invention, the page tables 130 are kept in contiguous virtual memory addresses for a given range.

Each page table 130 describes a 1 MB region of virtual memory 120. By storing the first page table header into the range descriptor 100 mapping memory to the first 4K page of a 1 MB section is provided. This provided for zero-byte alignment to the beginning of a 1 MB section. Storing the first page table header into the range descriptor 100 is optional, but not storing the first page table header into the range descriptor 100 means losing the ability to use the first 4K page.

Virtual memory 120 is made up of segments 122. The segments 122 are mapped to physical memory pages 140 through page table 130 using page table entries 150. On the ARM architecture virtual memory 120 can address from zero (0) to four gigabytes (4G) of virtual storage. On the ARM architecture each page table 130 contains 256 page table entries 150.

A global top level page table pointer 123 points to top level page table 125. The top level page table 125 contains page table pointers 127 to page tables 130. Each page table 130 maps a 1 MB range of virtual memory. In one embodiment of the present invention the address range mapped by the range descriptor 100 is an exact multiple of 1 MB in size and starting address. Thus, a range descriptor 100 can cover one or more of these 1 MB sections of memory. In order to locate the page table 130 for the range descriptor 100, the top level page table 125 is queried, and used to find the pointer to the appropriate page table 130 for the range. It is possible for one virtual memory segment 122 to span two or more page tables 130. Conceptually, all the page tables 130 for a given range can be thought of as being consecutive, although in practice, they can be scattered all over memory. The present invention detects when the end of a page table 130 is reached so that the next one can be found.

Each page table entry 150 reserves certain bits to indicate to the virtual memory system that the page table entry is invalid, as illustrated in FIG. 1B. On the ARM, this is accomplished by setting bits 0 and 1 of the PTE to zero. After this is done, the other bits are free to use for any user defined purpose. In one embodiment of the present invention, use of bits 2 through 11 is avoided. Bits 12 through 31 are therefore free to keep track of additional bookkeeping (or physical memory page mapping) information for virtual memory segmentation.

Continuing with FIG. 1B, Bit 12 is used to distinguish between invalid PTEs that are reserved segment headers 160, and invalid PTEs that are free segment headers 170. If bit 12 of an invalid PTE is set to one, then the page table entry 150 is a free header page table entry (FH-PTE) 170. The first free header PTE 170 of a segment uses bits 13 to 31 to point to the next free segment. The value stored is the page table index value of the first PTE of the next free segment's page table entry 172 (not counting the reserved header PTE 160).

If bit 12 of an invalid PTE is set to zero, then the PTE 150 is a reserved header page table entry (RH-PTE) 160 which is used as part of a segment 122 header. Bits 31 through 13 of an RH-PTE 160 are used to store the size of the segment 162. This size field can be thought of as the header for the corresponding segment 122. The page index value for the segment 122 is considered to start immediately after the header, such that the header is found at an offset of −1 relative to the start of the segment 122.

The first segment's (at virtual memory address 0 in FIG. 1A) header page table entry 150 has no such header in the page table 130, since this would require an invalid page table entry 150 right at the start of the segment 122, and it is often desirable to make certain segments start directly on a range boundary (e.g., 1 MB). Therefore, the first segment 122 is handled as a slightly special case, with its header, first header page table entry 112, being stored in the range descriptor 100 for the range.

Figure 2:
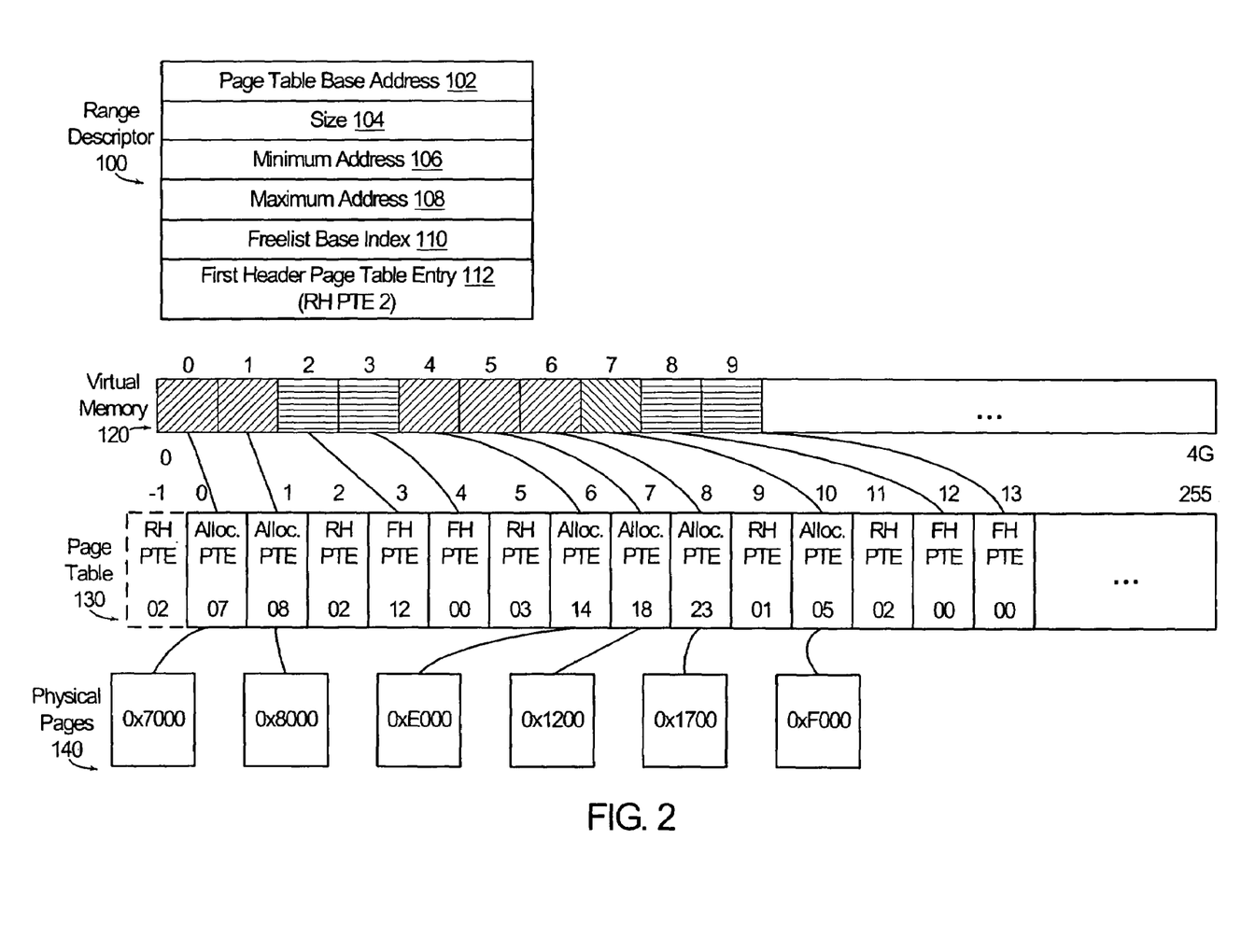
FIG. 2 is a diagram of an exemplary use of the virtual memory segmentation data structures of FIGS. 1A and 1B.

FIG. 2 is a diagram of an exemplary use of the virtual memory segmentation data structures of FIGS. 1A and 1B following the principles of the present invention. In each of the following diagrams, each PTE 150 will be represented by a mnemonic representing its type (i.e., reserved header, free header, and page table entry), followed by two digits that represent the value stored in bits 13 through 31. In practice, much larger numbers would be stored than could be represented by two digits, but two digits is sufficient for purposes of illustration. The page table entry type mnemonics are: "Alloc. PTE" for allocated segments, encoded in valid page table entries 150; "RH-PTE" for reserved header page table entries 160, encoded in invalid (bit 12=0) page table entries 150; and "FH-PTE" for free header page table entries 160, encoded in invalid (bit 12=1) page table entries 150. In all of the page table 130 diagrams, the page table indices can be thought of as starting from −1, since the special-case header PTE (i.e., first header page table entry 112) is shown first (using a dashed line to distinguish it from actual page table entries 150). Keep in mind that first header page table entry 112 is not actually stored in the page table 130, but rather in the range descriptor 100. Thus, a typical page table 130 is shown in FIG. 2.

With reference to FIG. 2, page table 130 shows three allocated segments and two free segments as follows. A first allocated segment has 8192 bytes (2 pages) mapped to physical memory addresses 0x7000 (7*4096) and 0x8000, this segment is shown as virtual memory 120 segments 0 and 1. A second allocated segment has 12288 bytes (3 pages) and is mapped to physical addresses 0xE000, 0x12000, and 0x17000, this segment is shown as virtual memory 120 segments 4, 5 and 6. A third allocated segment has one 4096 bytes (1 page) which is mapped to physical address 0xF000, this segment is shown as virtual memory 120 segment 7. Page table 130 also shows two free segments, both of size 2 pages, these segments are shown as virtual memory 120 segments 2, 3 and 8, 9, respectively.

Reading page table 130 from left to right one can see that the first segment (page table 130 index −1 because it is actually stored in range descriptor 100 at 112) is a reserved header page table entry (RH-PTE) defining two allocated pages. The two allocated pages are followed by a free header page table entry (FH-PTE) defining two free pages. The first FH-PTE (at index 3 in page table 130) stores the index of the next free segment (i.e., page table 130 index 12). The two free pages at index 3 and 4 in page table 130 are followed by a RH-PTE defining three more allocated pages (i.e., page table 130 indices 6, 7 and 8). A subsequent RH-PTE defines an additional allocated page (i.e., page table 130 index 10). Finally, a free header page table entry (FH-PTE) defines 2 more free pages (i.e., page table 130 indices 12 and 13). A reserved header page table entry (RH-PTE 160) will precede a page table entry 150 corresponding to a free or allocated virtual memory segment.

Figure 3A:
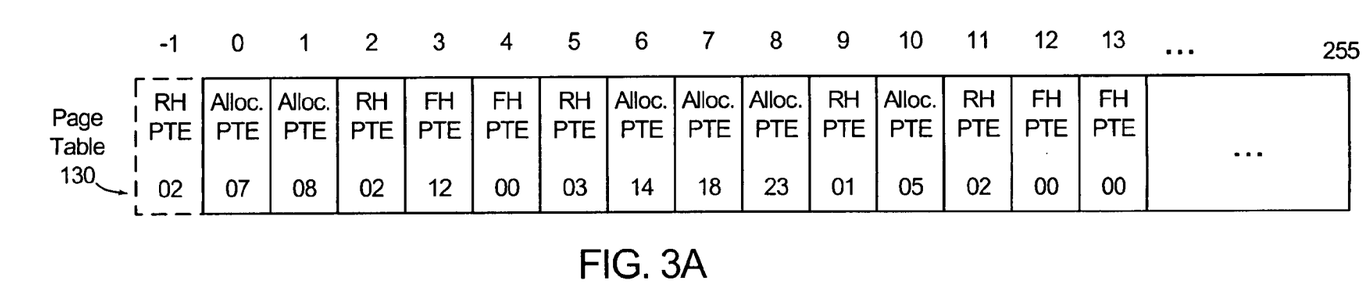
FIGS. 3A, 3B and 3C are diagrams of example page tables and page table entries illustrating freeing and coalescing of page table entries.
Figure 3B:
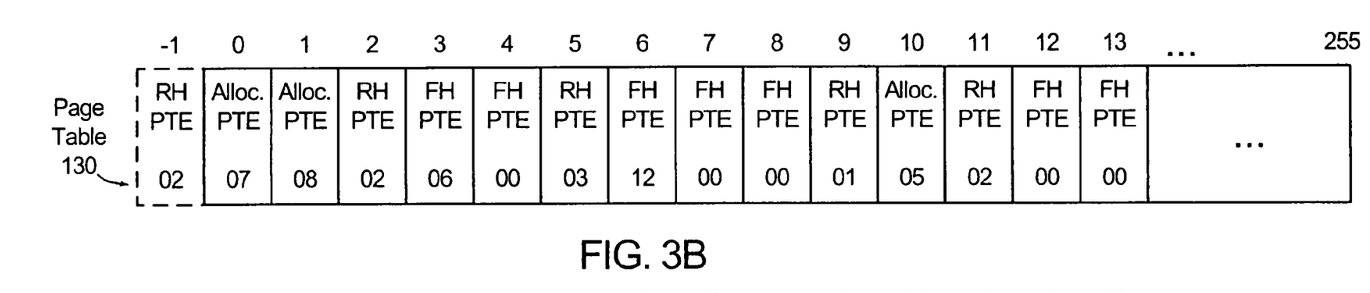
Figure 3C:
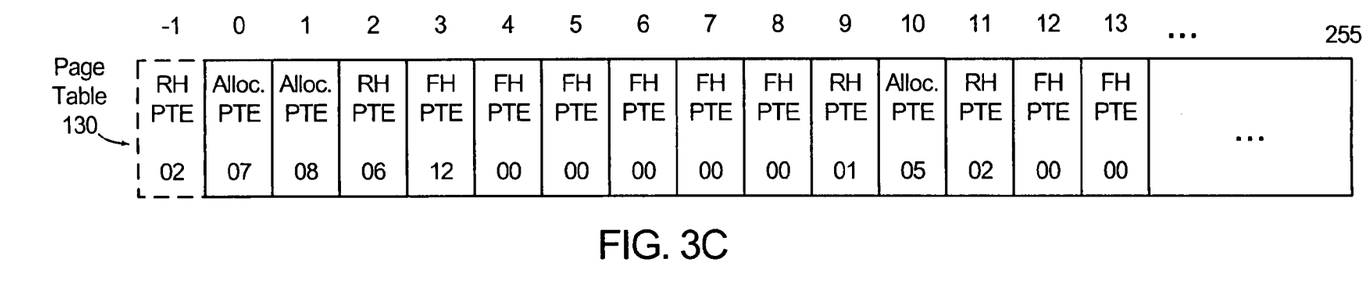

FIGS. 3A, 3B and 3C are diagrams of example page tables 130 and page table entries 150 illustrating freeing and coalescing of page table entries. When a segment 122 in virtual memory is freed, there is at least one extra page table entry 150 made available, since all segments 122 are at least one page in length. This extra PTE 150 is used to store the page index of the next free segment 122, such that they form a linked list. The very first free segment 122 of virtual memory 120 is kept track of as freelist base index 110 in the range descriptor 100 (FIG. 1A), such that allocations are a simple matter of jumping to the first free segment 122, and traversing the linked list until a large enough suitable segment 122 is found.

When freeing segments 122, adjacent free segments 122 are coalesced. This will always result in one extra PTE 150 becoming free, since the reserved header page table entry (RH-PTE 170) of the second of the adjacent free segments 122 is no longer needed and can become another free PTE 150.

FIG. 3A illustrates the page table 130 as defined in FIG. 2. When the allocated segment 122 starting at page table index 6 (FIG. 3A) is freed (i.e., segments 122 at page table indices 6, 7 and 8 are freed), two adjacent free segments 122 are created (i.e., segments 122 at page table indices 3, 4 and 6, 7, 8). FIG. 3B illustrates these two free segments 122. A reserved header page table entry (RH-PTE) defining two free pages is illustrated at page table index 2. An adjacent reserved header page table entry (RH-PTE) defining three free pages is illustrates at page table index 5. The two adjacent free segments 122 (at page table indices 3, 4 and 6, 7, 8) can be coalesced into one free segment 122. FIG. 3C illustrates the two adjacent free segments 122 coalesced into one free segment 122 defined by reserved header page table entry (RH-PTE) at page table index 2 reserving six free pages. Note that the two adjacent free segments 122 originally (in FIG. 3B) only contained two pages plus three pages, respectively, but the coalesced segment 122 (in FIG. 3C) contains six pages. This is because only one reserved header page table entry (RH-PTE) 160 (at page table index 2) is needed to manage the coalesced segment 122, thus freeing up the reserved header page table entry (RH-PTE) 160 (at page table index 5 in FIG. 3C). The freed reserved header page table entry (RH-PTE) 160 is converted into a free segment 122.

Figure 4A:
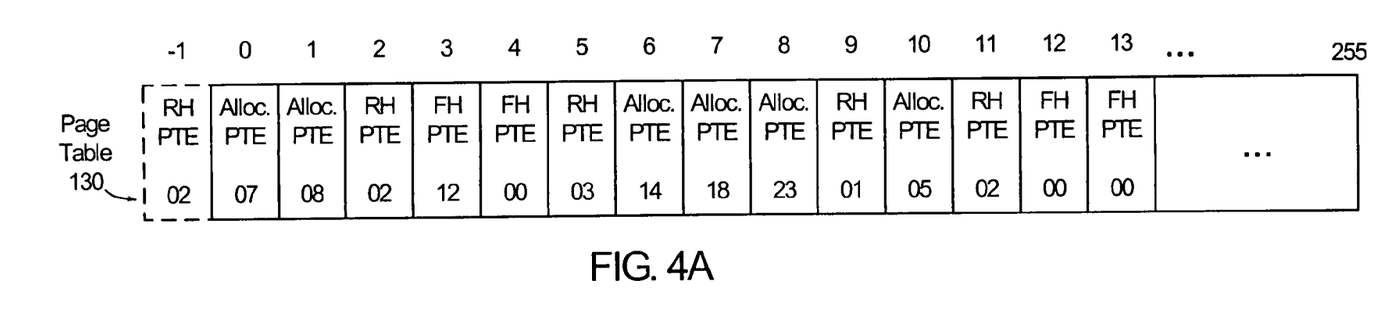
FIGS. 4A and 4B are diagrams of example page tables and page table entries illustrating leftover page table entries.
Figure 4B:
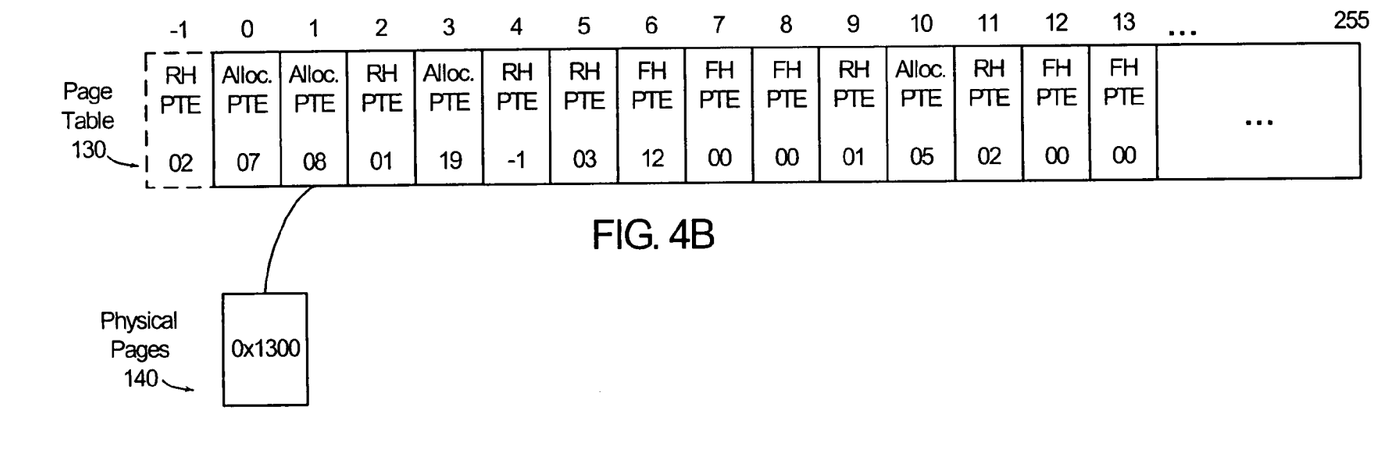

FIGS. 4A and 4B are diagrams of example page tables 130 and page table entries 150 illustrating leftover page table entries 150. When allocating a segment 122, if the segment 122 being allocated is smaller than the free segment 122 that is chosen, the free segment 122 is split into two portions. One portion becomes the newly allocated segment 122, and the other portion becomes a new smaller free segment 122. Due to the requirement that all segments 122, free or allocated, use up at least two PTEs 150, it is possible to end up with a leftover single PTE 150 in the case where the segment being allocated uses up all but one of the free segments. Since normal free segments require two PTEs to describe, one for a reserved header page table entry header (with the size), a and one for a free header page table entry (with the next free segment). This leftover PTE implies a size of zero (page table headers don't count as part of the size). The leftover PTE doesn't have a next field, nor does it need one, because the previous free segment just skips over it (no segment in the free list has a link to these leftover PTEs). The single leftover single PTE 150 is marked with a size field having all bits set to one (the maximum possible value) to signify that it is one of the special single leftover PTEs 150. When a segment is freed, the leftover PTEs are looked for on either side of the new freed segment, and merged into the new free segment.

FIG. 4A illustrates the page table 130 as defined in FIG. 2. If a segment 122 with a size of one page is allocated at page table index 3, page table 130 would contain a single leftover PTE 150 at page table index 4. FIG. 4B illustrates the newly allocated segment 122 at page table index 3 (mapped to physical memory page 0x1300) and the single leftover PTE 150 at page table index 4.

Figure 5:
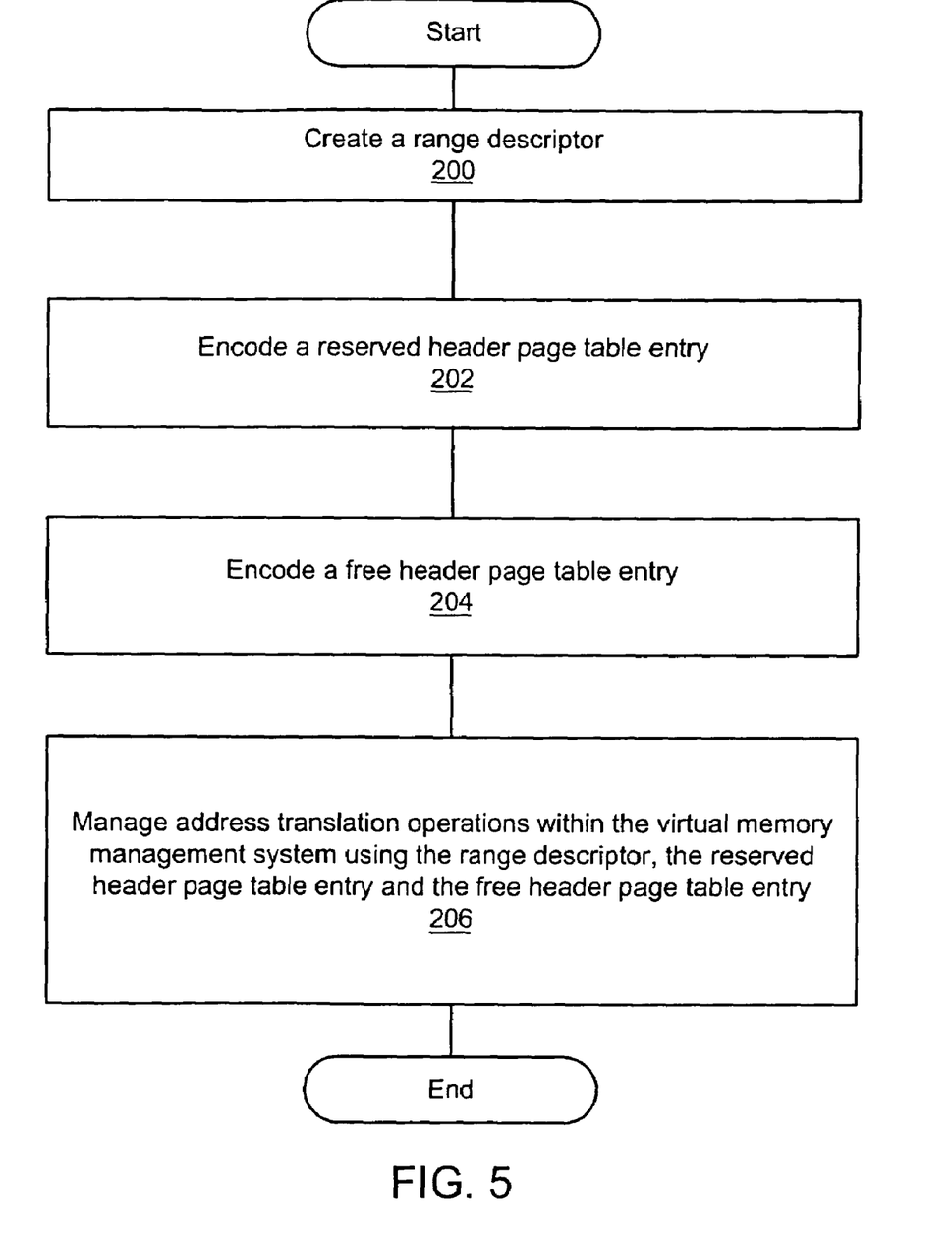
FIG. 5 is a flow diagram of a method for segmentation management in a virtual memory management system according to the present invention.

FIG. 5 is a flow diagram of the invention method for managing memory segmentation in a virtual memory system. A range descriptor 100 for managing segmentation using a page table 130 is created at Step 200. The range descriptor 100 contains an index 110 value corresponding to a first free segment referenced by the page table 130.

At Step 202 a reserved header page table entry 160 is encoded to indicate that the corresponding segment is reserved and to indicate a size of the segment. A respective reserved header page table entry 160 precedes each page table entry 150 corresponding to a segment 122 that is an allocated segment or a free segment. A free header page table entry 170 is encoded to indicate that a segment is free and to indicate a value for the index within the page table 130. The index value corresponds to the next free segment 122. A respective free header page table entry 170 precedes each segment 122 that is a free segment 122.

At Step 204 address translation operations are managed within the virtual memory system using the range descriptor 100, the reserved header page table entries 160 and the free header page table entries 170 such that allocation of additional virtual memory system data structures is avoided.

Figure 6:
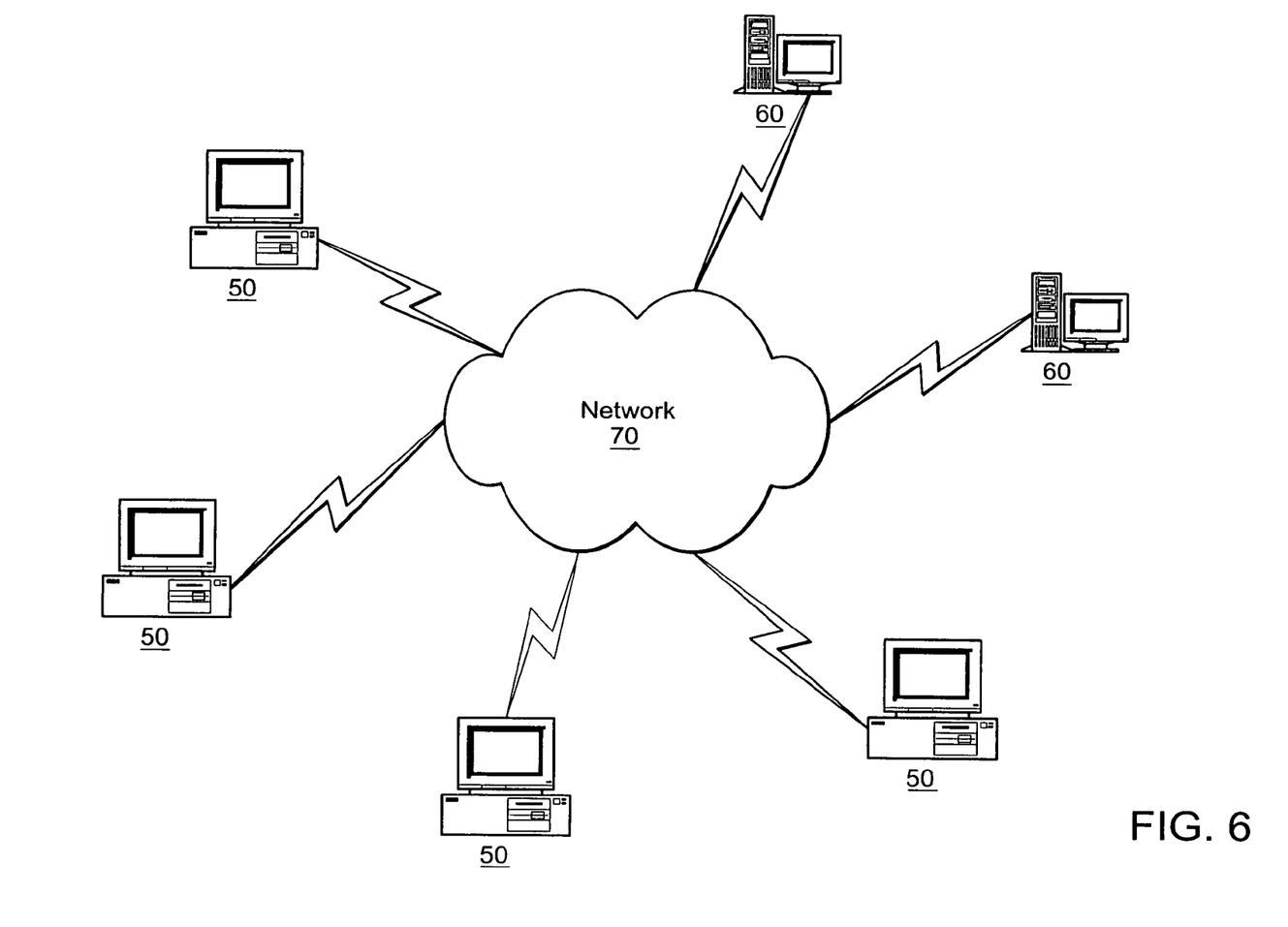
FIG. 6 is a diagram of a computer system on which an embodiment of the present invention is implemented.

FIG. 6 is a diagram of a computer system on which an embodiment of the present invention is implemented. Client computer 50 and server computer 60 provide processing, storage, and input/output devices for managing memory segmentation in a virtual memory system. The client computers 50 can also be linked through a communications network 70 to other computing devices, including other client computers 50 and server computers 60. The communications network 70 can be part of a local network or a global network such as the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, managing memory segmentation in a virtual memory system can be implemented on a stand-alone computer.

Figure 7:
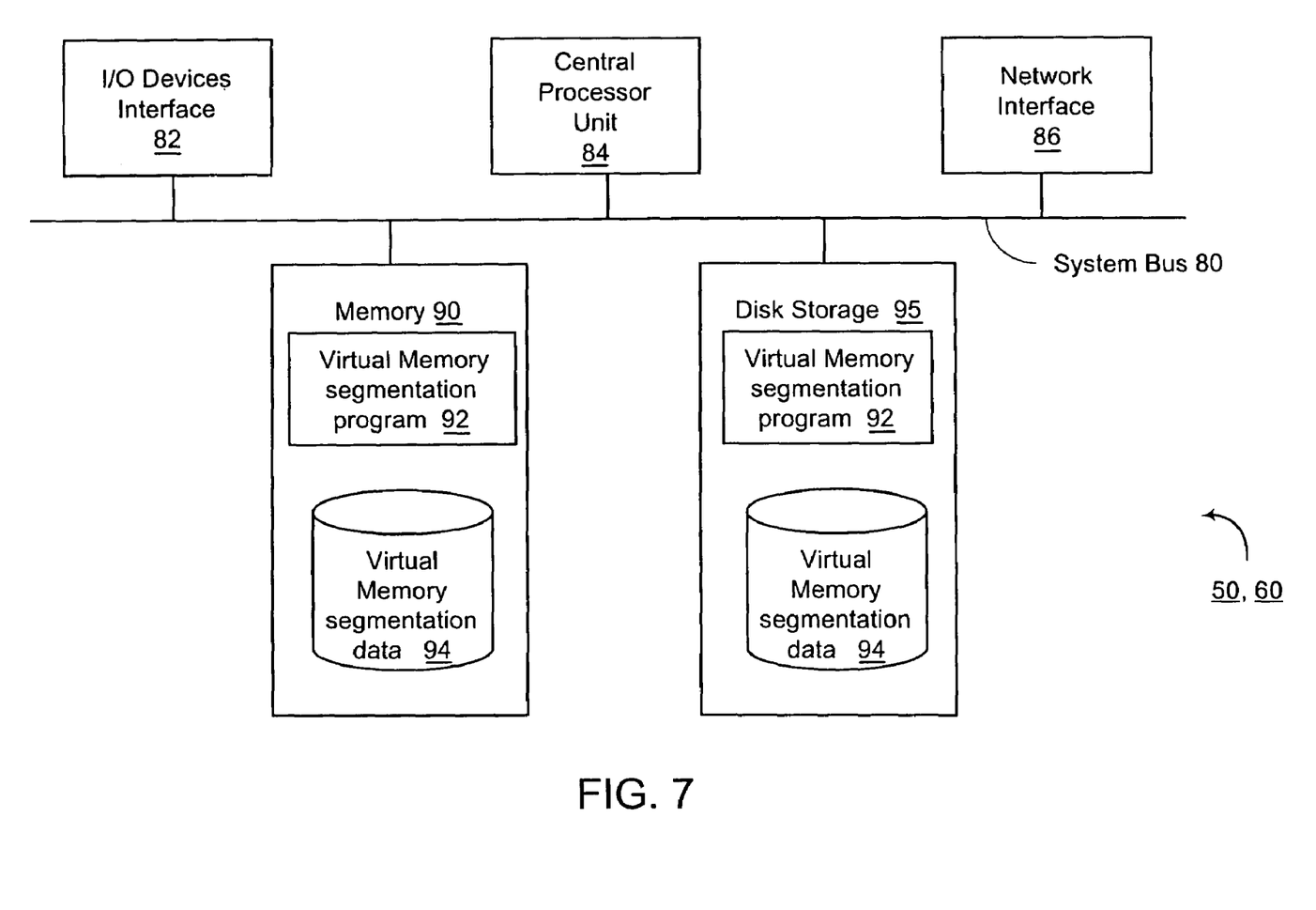
FIG. 7 is a diagram of the internal structure of a computer in the computer system of FIG. 6.

FIG. 7 is a diagram of the internal structure of a computer (e.g., 50, 60) in the computer system of FIG. 6. Each computer 50, 60 contains a system bus 80, where a bus is a set of hardware lines used for data transfer among the components of a computer. A bus 80 is essentially a shared conduit that connects different elements of a computer system (e.g., processor, disk storage, memory, input/output ports, network ports, etc.) that enables the transfer of information between the elements. Attached to system bus 80 is an I/O device interface 82 for connecting various input and output devices (e.g., displays, printers, speakers, etc.) to the computer 50, 60. A network interface 86 allows the computer 50, 60 to connect to various other devices attached to a network (e.g., network 70). A memory 90 provides volatile storage for computer software instructions (e.g., virtual memory segmentation program 92 and virtual memory segmentation data 94 used to implement an embodiment of the present invention. Disk storage 95 provides non-volatile storage for computer software instructions and data (e.g., virtual memory segmentation program 92 and virtual memory segmentation data 94) used to implement an embodiment of the present invention.

A central processor unit 84 is also attached to the system bus 80 and provides for the execution of computer instructions (e.g., virtual memory segmentation program 92 and virtual memory segmentation data 94), thus providing the computer 50, 60 the ability to manage or provide memory segmentation in a virtual memory system.

While this invention has been particularly shown and described with references to preferred embodiments thereof, it will be understood by those skilled in the art that various changes in form and details may be made therein without departing from the scope of the invention encompassed by the appended claims. Specifically, the Advanced RISC Machine (ARM) architecture is but one of many computer architectures that employ virtual memory management techniques. The scope of the present invention encompasses any virtual memory segmentation system and is not limited to any particular computer architecture.

What is claimed is:

1. A method for managing memory segmentation in a virtual memory system, comprising:
   creating a range descriptor for managing segmentation using a page table, the page table being formed of page table entries that correspond to respective segments in virtual memory, the range descriptor containing an index value corresponding to a first free segment in virtual memory referenced by the page table;
   in the page table, encoding a reserved header page table entry to indicate that a segment in virtual memory is reserved, such that the page table has a respective reserved header page table entry preceding each page table entry corresponding to a segment that is an allocated segment or a free segment;
   in the page table, encoding a free header page table entry to indicate that a segment in virtual memory is free, such that the page table entry has a respective free header page table entry preceding each page table entry corresponding to a free segment; and
   managing address translation operations within the virtual memory system using the range descriptor, reserved header page table entries and free header page table entries such that allocation of additional virtual memory system data structures is avoided.

2. The method of claim 1 wherein the reserved header page table entry further comprises an indication of a size of the segment.

3. The method of claim 1 wherein the free header page table entry further comprises an indication of a page table index value corresponding to the next free segment.

4. The method of claim 1 wherein the header page table entry is 32 bits long and the reserved header page table entry is indicated by a zero-bit in bit location 12 and the free header page table entry is indicated by a one-bit in bit location 12.

5. The method of claim 1 wherein a first header page table entry is allocated in the range descriptor such that the first allocated segment or first free segment is aligned on a zero-byte boundary.

6. The method of claim 1 wherein a first free segment and a second free segment are adjacent and are merged into a single new free segment resulting in an available header page table entry becoming free for further use.

7. The method of claim 1 wherein a new allocated segment is allocated from an existing free segment leaving all but one free segment leftover in the existing free segment.

8. The method of claim 7 wherein the one free leftover segment is encoded as an available reserved header page table entry marked with a size field comprising all one-bits.

9. A virtual memory segmentation apparatus, comprising:
   a range descriptor managing segmentation using a page table, the page table being formed of page table entries that correspond to respective segments in virtual memory, the range descriptor containing an index value corresponding to a first free segment in virtual memory referenced by the page table;
   a reserved header page table entry encoded in the page table to indicate that a segment in virtual memory is reserved, such that the page table has a respective reserved header page table entry preceding each page table entry corresponding to a segment that is an allocated segment or a free segment;
   a free header page table entry encoded in the page table to indicate that a segment in virtual memory is free, such that the page table entry has a respective free header page table entry preceding each page table entry corresponding to a free segment; and
   a processor managing address translation operations within the virtual memory system using the range descriptor, reserved header page table entries and free header page table entries such that allocation of additional virtual memory system data structures is avoided.

10. The apparatus of claim 9 wherein the reserved header page table entry further comprises an indication of a size of the segment.

11. The apparatus of claim 9 wherein the free header page table entry further comprises an indication of a page table index value corresponding to the next free segment.

12. The apparatus of claim 9 wherein the header page table entry is 32 bits long and the reserved header page table entry is indicated by a zero-bit in bit location 12 and the free header page table entry is indicated by a one-bit in bit location 12.

13. The apparatus of claim 9 wherein a first header page table entry is allocated in the range descriptor such that the first allocated segment or first free segment is aligned on a zero-byte boundary.

14. The apparatus of claim 9 wherein a first free segment and a second free segment are adjacent and are merged into a single new free segment resulting in an available header page table entry becoming free for further use.

15. The apparatus of claim 9 wherein a new allocated segment is allocated from an existing free segment leaving all but one free segment leftover in the existing free segment.

16. The method of claim 15 wherein the one free leftover segment is encoded as an available reserved header page table entry marked with a size field comprising all one-bits.

17. A virtual memory segmentation apparatus, comprising:
- means for creating a range descriptor for managing segmentation using a page table, the page table being formed of page table entries that correspond to respective segments in virtual memory, the range descriptor containing an index value corresponding to a first free segment in virtual memory referenced by the page table;
- means for encoding a reserved header page table entry in the page table to indicate that a segment in virtual memory is reserved, such that the page table has a respective reserved header page table entry preceding each page table entry corresponding to a segment that is an allocated segment or a free segment;
- means encoding a free header page table entry in the page table to indicate that a segment in virtual memory is free, such that the page table entry has a respective free header page table entry preceding each page table entry corresponding to a free segment; and
- means for managing address translation operations within the virtual memory system using the range descriptor, reserved header page table entries and free header page table entries such that allocation of additional virtual memory system data structures is avoided.

18. A computer program product comprising:
- a computer usable medium for managing memory segmentation in a virtual memory system;
- a set of computer program instructions embodied on the computer usable medium, including instructions to:
- create a range descriptor for managing segmentation using a page table, the page table being formed of page table entries that correspond to respective segments in virtual memory, the range descriptor containing an index value corresponding to a first free segment in virtual memory referenced by the page table;
- encode a reserved header page table entry in the page table to indicate that a segment in virtual memory is reserved, such that the page table has a respective reserved header page table entry preceding each page table entry corresponding to a segment that is an allocated segment or a free segment;
- encode a free header page table entry in the page table to indicate that a segment in virtual memory is free, such that the page table entry has a respective free header page table entry preceding each page table entry corresponding to a free segment; and
- manage address translation operations within the virtual memory system using the range descriptor, reserved header page table entries and free header page table entries such that allocation of additional virtual memory system data structures is avoided.

19. A method of overloading a page table to provide management of memory segmentation in a virtual memory system, comprising:
- encoding memory segmentation data using bits that are reserved in page table entries of the page table, the page table entries marked as invalid page table entries; and
- managing address translation operations within the virtual memory system using the invalid page table entries within an overloaded page table.

20. The method of claim 19, wherein the memory segmentation data is a pointer to a next free segment.

21. The method of claim 19, wherein the memory segmentation data is an indication of the size of a segment.

* * * * *